United States Patent [19]

Carmien

[11] Patent Number: 4,605,254
[45] Date of Patent: Aug. 12, 1986

[54] REINFORCED HANDLE AND METHOD OF MAKING SAME

[76] Inventor: Joseph A. Carmien, 525 N. Maple Dr., Beverly Hills, Calif. 20210

[21] Appl. No.: 612,431

[22] Filed: May 21, 1984

Related U.S. Application Data

[63] Continuation-in-part of Ser. No. 407,818, Aug. 13, 1982, abandoned.

[51] Int. Cl.$^4$ .............................................. B25G 1/10
[52] U.S. Cl. ..................................... 294/57; 294/19.1
[58] Field of Search .................. 294/57, 58, 19, 24, 294/27 H, 86; 16/110 R, 138.8 B, DIG. 18, DIG. 19; 156/180, 181, 379.6, 441, 449; 273/80 R, 81 R, 81 A, 81 B, 67 DA, 67 J; 7/167

[56] References Cited

U.S. PATENT DOCUMENTS

| | | | |
|---|---|---|---|
| 2,929,409 | 3/1960 | Waehner | 273/80 R |
| 2,948,649 | 8/1960 | Pancherz | 156/180 |
| 3,549,189 | 12/1970 | Alosi | 294/57 |
| 3,712,659 | 1/1973 | Kneissl | 294/57 |
| 3,782,725 | 1/1974 | Giambazi | 273/81 B |

Primary Examiner—James B. Marbert
Attorney, Agent, or Firm—Kelly, Bauersfeld & Lowry

[57] ABSTRACT

A lightweight rod is strengthened by one or more longitudinally extending reinforcing beads of fiber-resin material which are integrally formed with a rod composite jacket during a pultrusion manufacturing process. Specifically, lightweight cores or alternating lightweight and reinforcing cores are introduced into a larger diameter pultrusion die tube. These cores can be provided with a particular shape and/or they can be introduced to the die tube so that the distance between the outer surface of the core and the inner surface of the die tube is non-uniform. Resin coated fibers are channeled into the space between the cores and the die tube where these fibers are compressed and heated to form a cured product. The result is a lightweight rod having longitudinally extending reinforcing beads of fiber-resin composite material where the distance between the lightweight core and the die tube was significantly greater than the average core to die tube distance.

17 Claims, 11 Drawing Figures

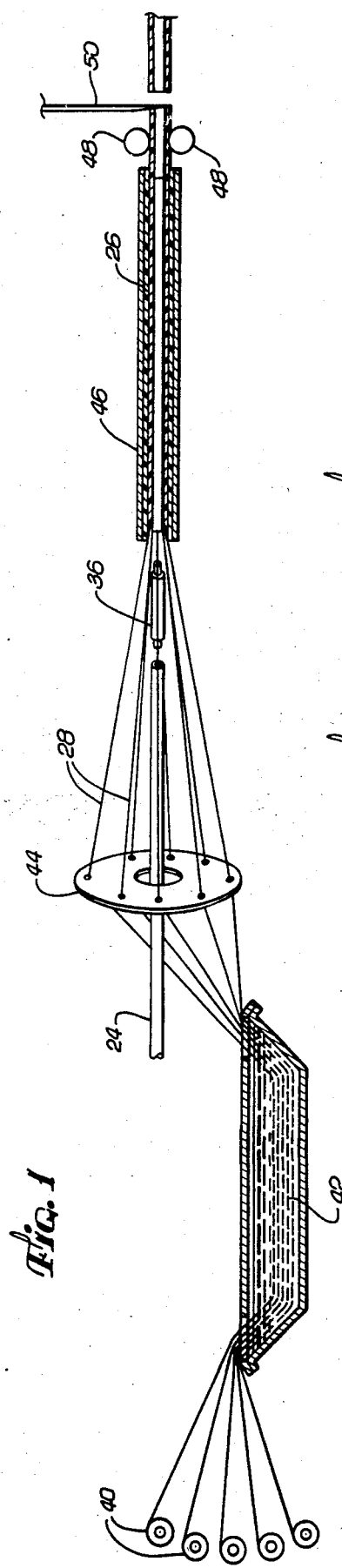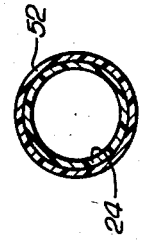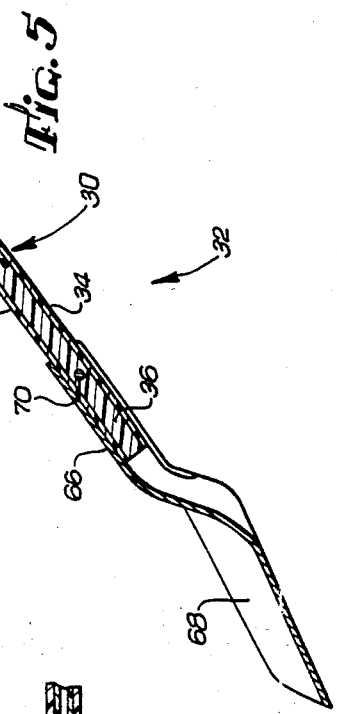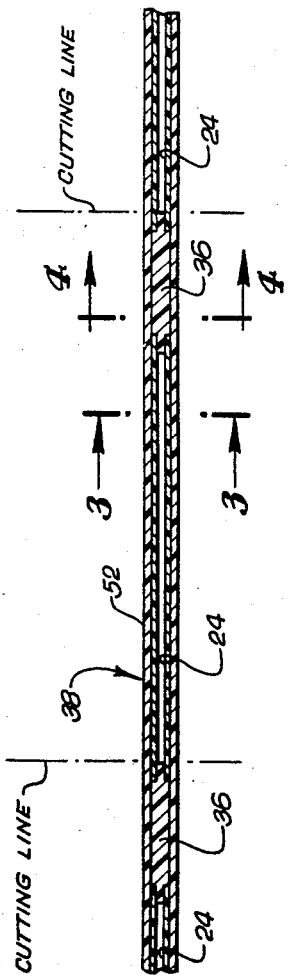

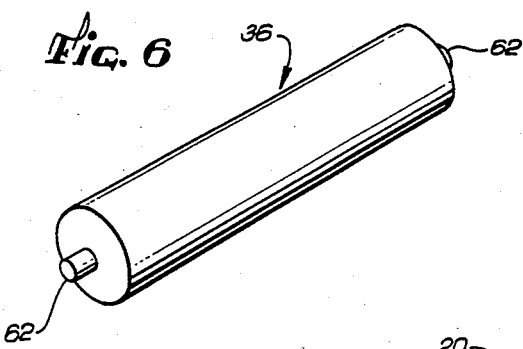
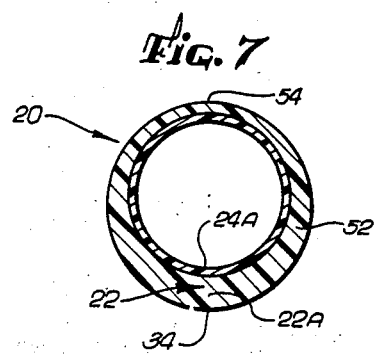
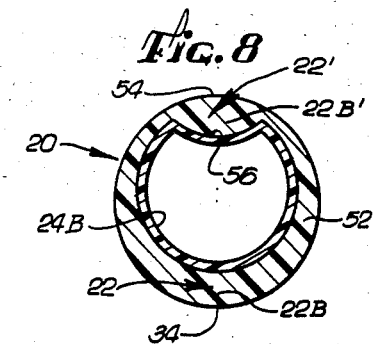
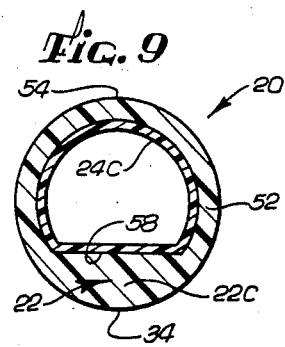
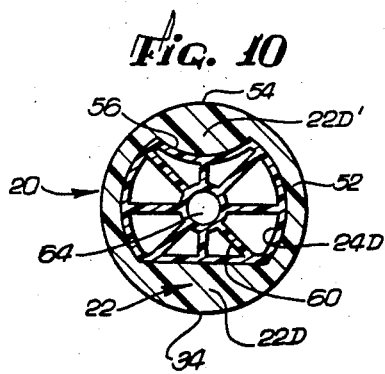
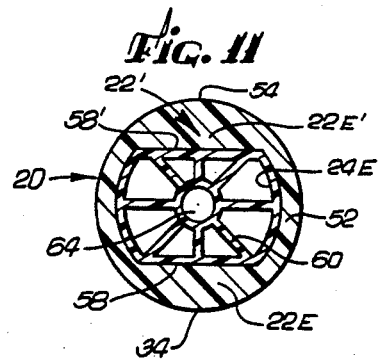

REINFORCED HANDLE AND METHOD OF MAKING SAME

RELATED APPLICATION

This application is a continuation-in-part of application Ser. No. 407,818, filed Aug. 13, 1982, now abandoned.

BACKGROUND OF THE INVENTION

This invention relates generally to fiber-resin composite pultrusion methods and products and, more particularly, to rods having one or more longitudinally extending reinforcing beads, and to a method for pultruding such rods.

In manufacturing a handle for a hand tool such as a shovel, competing design considerations are at play. On the one hand, it is desirable to have a handle that is as light as possible, to provide for easy use by consumers. On the other hand, the handle must have the structural integrity to withstand the variety of stresses that will be placed on it. Wooden handles have been used, but these provide an unacceptable compromise of weight for structural integrity or vice versa.

An alternative to wooden handles is the use of rods formed from resin coated fibers. The basic technique for running filaments through a resin bath and then into a long heated die tube to produce a cured composite of the same shape as the die tube has been known for some time. See, for example, U.S. Pat. Nos. 2,948,649 and 3,556,888. This method, however, produces a solid extruded product which is unacceptably heavy and/or too rigid.

The weight problem can be alleviated by means of an existing process to extrude hollow tubes utilizing a die tube with the center filled, leaving an annular cross-section through which the fibers are pulled. However, this weight reduction is achieved at the cost of significantly lower tensile and compression (bending) strength than that of a solid rod, and therefore would not be suitable for use in certain high-stress applications, such as general purpose shovel handles. Further, to increase interlaminar strength, a substantial percentage of fibers running other than in a longitudinal direction are usually required. Moreover, commercial machines for producing continuous hollow tubing are extremely expensive.

As illustrated and described in my co-pending U.S. patent application, Ser. No. 407,818, the bending strength of tool handles can be improved by producing rods which are substantially hollow or lightweight throughout most of their length, but reinforced at areas of expected increased stresses. However, even such improved tool handle rods have proven to be less than ideal in some situations due to the inherent strength characteristics of the fiber-resin composite material forming the rod jackets. For instance, the edge of a hole often acts as fulcrum upon the bottom side of the shovel handle when the shovel head is firmly lodged in the hole and downward pressure is exerted on the handle. In such situations, extreme bending stresses are created within the handle near the fulcrum point, tending to compress the bottom side of the handle and pull-apart the top side.

When a tool handle constructed of a fiber-resin composite fails under such loading, the failure usually occurs along the bottom side because fiber-resin composite materials are typically much weaker in compression than in tension. Moreover, depending on the depth of the hole and the manner in which the downward pressure is applied, the fulcrum point against the bottom side of the handle will vary widely in different situations. It is therefore difficult to adequately strengthen a shovel handle with reinforcing cores alone, since the maximum stresses can be applied anywhere along the entire length of the handle.

Accordingly, there has existed a need for a lightweight tool handle rod having superior strength characteristics than prior handles, and a convenient method for producing such a rod in a quick, reliable and efficient manner. A reinforced rod having increased resistance to failure in compression, while minimizing any weight increase, is preferred. Further, it is desirable that such tool handle rods have improved bending resistance along their entire lengths, since the points of greatest stress can vary greatly. The present invention satisfies these needs and provides other related advantages.

SUMMARY OF THE INVENTION

The present invention resides in a high-strength, lightweight rod having one or more longitudinally extending reinforcing beads of fiber-resin material, and a method for producing such a rod. More specifically, the method of the present invention includes the introduction of a lightweight core into a larger diameter pultrusion die tube. This lightweight core can have a particular shape and/or it can be introduced into the die tube so that the distance between the outer surface of the core and the inner surface of the die tube is non-uniform. Resin coated fibers are channeled into the space between the core and the die tube where they are compressed and heated to form a cured product. The result is a lightweight rod having longitudinally extending reinforcing beads of fiber-resin composite material where the distance between the lightweight core and the die tube was significantly greater than the average core to die tube distance.

In one preferred form, a lightweight tubular core is eccentrically introduced into the pultrusion die tube so that the distance between the outer surface of the core and the inner surface of the die tube is non-uniform. As the resin coated fibers are heated and cured within the die tube, a high strength fiber-resin composite jacket is formed around the core. The resulting rod has outer dimensions which correspond to those of the inside of the die tube, and the rod provides a longitudinally extending reinforcing bead where the distance between the lightweight core and the die tube was significantly greater than the average core to die tube distance. The reinforcing bead increases the crushing or bending resistance of the rod, and is highly desirable where a particular side of the rod is expected to be exposed to extraordinary compressive forces.

In another preferred form, an alternate lightweight, generally tubular core is provided which includes a longitudinally extending U-shaped channel. This alternate core is preferably eccentrically positioned as it travels through the die tube so that reinforcing beads are integrally formed in the composite jacket at the U-shaped channel and on an opposite side where the distance between the alternate core and the die tube was significantly greater than the average core to die tube distance. Normally, the reinforcing beads are positioned 180 degrees from one another to complement each other in providing increased tensile as well as compression strength to the rod.

Moreover, lightweight cores having many other shapes can be advantageously used in accordance with the present invention to increase the compression and/or tensile strength characteristics of the manufactured rods to fit particular circumstances. For instance, a modified lightweight core, shaped to resemble a tube having a longitudinally extending flat surface, can be positioned within the die tube to form a rod having a reinforcing bead in the space between the flat surface of the core and the inner surface of the die tube. Such a reinforced rod would be particularly useful in applications where especially high compression stresses along the reinforced side were expected, and a slight increase in rod weight would be acceptable.

Notwithstanding the shape and/or the positioning of the lightweight cores, all rods constructed in accordance with the present invention can be further strengthened by alternately inserting a reinforcing core between the lightweight cores. The reinforcing cores, preferably made of the same or a similar fiber-resin composite material as the jacket, can be introduced into the die tube to produce a reinforced rod having the reinforcing cores at locations most likely to be subjected to the greatest bending stresses. Additionally, these reinforcing cores can have a different cross-sectional shape from the adjacent lightweight cores, however it is preferred that the lightweight and reinforcing cores be similarly shaped and placed within the die tube.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a schematic representation of a pultrusion machine adapted to perform the method of the present invention;

FIG. 2 is a fragmentary sectional view of a pultruded rod with an alternating lightweight and reinforced configuration, manufactured in accordance with my copending U.S. patent application, Ser. No. 407,818;

FIG. 3 is an enlarged, sectional view taken generally along the line 3—3 of FIG. 2, illustrating the concentric positioning of a non-reinforcing core, and the absence of a reinforcing bead;

FIG. 4 is an enlarged, sectional view taken generally along the line 4—4 of FIG. 2, illustrating the concentric positioning of a reinforcing core, and the absence of a reinforcing bead;

FIG. 5 is a sectional view of an exemplary reinforced rod manufactured in accordance with the present invention, illustrating the exemplary rod when used as a shovel handle;

FIG. 6 is a perspective view of a reinforcing core, illustrating protruding plugs used in attaching adjacent cores;

FIG. 7 is an enlarged, sectional view taken generally along the line A—A of FIG. 5, illustrating the eccentric positioning of a lightweight tubular core within a fiber-resin composite jacket to form a reinforcing bead generally along its bottom side;

FIG. 8 is an enlarged, sectional view taken generally along the line A—A of FIG. 5, illustrating the eccentric positioning of an alternate lightweight, generally tubular core which includes a longitudinally extending U-shaped channel, and two oppositely situated reinforcing beads integrally formed within the composite jacket;

FIG. 9 is an enlarged, sectional view taken generally along the line A—A of FIG. 5, illustrating the positioning of a modified lightweight core which is shaped to resemble a tube having a longitudinally extending flat surface, and a reinforcing bead adjacent the flat surface;

FIG. 10 is an enlarged, sectional view taken generally along the line A—A of FIG. 5, illustrating another lightweight core having an internal web lattice, and an upper and lower reinforcing bead situated, respectively, in the U-shaped channel and adjacent the flat surface of the core; and FIG. 11 is an enlarged, sectional view taken generally along the line A—A of FIG. 5, illustrating another lightweight core, and a composite jacket having a pair of oppositely situated and similarly configured reinforcing beads.

DETAILED DESCRIPTION OF THE PREFERRED EMBODIMENTS

As shown in the drawings for purposes of illustration, the present invention is embodied in a fiber-resin composite rod, generally designated by the reference number 20, having one or more longitudinally extending reinforcing beads 22 running along all or a portion of its length, and a pultrusion method for its production. More specifically, the method of the present invention includes the introduction of a lightweight core 24 into a larger diameter pultrusion die tube 26. This lightweight core 24 can have a particular shape and/or it can be introduced into the die tube 26 so that the distance between the outer surface of the core and the inner surface of the die tube is non-uniform. Resin coated fibers 28 are channeled into the space between the lightweight core 24 and the die tube 26, resulting in the formation of a continuous rod 20 having longitudinally extending reinforcing beads 22 of fiber-resin composite material where the distance between the core and the die tube was significantly greater than the average core to die tube distance. Throughout this specification, the term "bead" is generally used to describe the extra fiber-resin composite material that fills the space between the core and the die tube where the distance between the two is significantly greater than the average distance between the core and the die tube throughout the remainder of the rod's cross section.

When used to provide improved handles 30 for hand tools and the like, the reinforced rods 20 of the present invention provide significant advantages over other handles currently known in the art. For instance, in improved handles 30 for implements such as shovels 32, a single longitudinally extending reinforcing bead 22 along the rod's bottom side 34 can greatly increase the resistance of the handle to bending stresses. This increase in bending stress resistance results from strengthening the improved rod 20 at its weakest points; along its bottom side 34 where the handle 30 is substantially stressed in compression. However, at times it is advantageous to provide one or more additional reinforcing beads 22' to further increase the resistance of the improved handle 30 to bending stresses. For example, an additional reinforcing bead 22' can be provided within the rod 20 generally opposite the compression resistant bead 22 to increase the level of tensile stress which can be withstood by the handle 30.

The improved tool handles 30 of the present invention are substantially stonger than prior handles, and the increased strength and bending resistance is obtained with little or no undesirable weight gain. Further, the provision of one or more longitudinally extending reinforcing beads 22 is particularly attractive because it is often difficult to determine in advance where the greatest stresses will be applied. Moeover, reinforcing cores 36 having the same or a different cross-sectional shape can be advantageously used in conjunction with the reinforcing beads 22 and the lightweight cores 24 to vastly increase the strength of the improved handles 30 while simultaneously minimizing any undesirable weight increase.

As taught in my co-pending U.S. patent application, Ser. No. 407,818, which is incorporated by reference herein, by providing fiber-resin rods 38 with reinforcing cores 36 in areas of expected localized stresses, a strong yet lightweight handle for tools can be manufactured which provides significant advantages over ordinary wooden handles. More specifically, as schematically illustrated in FIG. 1, a fiber material 28 is drawn off a series of spools or bales 40, then passed through a resin bath 42, and through a carding disk 44 into the die tube 26 where the fibers surround alternating sections of non-reinforcing and reinforcing cores 24 and 36. An exemplary reinforcing core 36 is illustrated in FIG. 6. The fibers 28 are pulled through the die tube 26, and are heated and cured about the cores 24 and 36 by a conventional conduction heater or a microwave heating element 46, which surrounds the die tube. The cured rod 38 is pulled out of the die tube 26 by tractor-type pullers 48 and cut into the desired length by a conventional cutting device 50.

Thus cured rod 38, as illustrated in FIGS. 2 through 4, typically has a uniformly tubular fiber-resin jacket 52 which extends throughout the rod's length, and which similarly surrounds both the lightweight non-reinforcing cores 24 (FIG. 3) and the reinforcing cores 36 (FIG. 4). While such rods 38 have higher overall strength characteristics than ordinary wooden handles, they are still less than ideal in certain circumstances. More specifically, shovel handles are normally used in a manner tending to load both ends, and cause the top side 54 of the handles to be stressed in tension and the bottom side 34 in compression. Further, when digging a hole, the edge of the hole is often used as a leverage point on the shovel 32, again causing the top side 54 of the handle to be stressed in tension and the bottom side 34 in compression. Because the fiber-resin material forming the jackets 52 of the cured rods 38 is inherently much stronger in tension than in compression, the bottom side 34 is typically where such rods fail when subjected to large bending stresses.

Although this failure problem can be alleviated by substituting a reinforcing core 36 for a lightweight non-reinforcing core 24 along the portion of the rod 38 where the greatest compressive forces will be applied, such a substitution necessarily increases the weight of the rod and, in many cases, proves to be an unacceptable tradeoff. Moreover, the precise point of failure is often difficult or impossible to determine in advance; making the selective placement of reinforcing cores 36 impractical. Therefore, it became necessary to devise the novel reinforced rod 20 for tool handles and the like, which has a higher bending stress resistance, and yet remains lightweight.

In accordance with the present invention, the method described in connection with FIG. 1 can be modified to produce rods 20 having one or more longitudinally extending reinforcing beads 22. As best illustrated in FIG. 7, to increase the bending resistance of fiber-resin composite rods 20, the lightweight tubular core 24A can be eccentrically introduced into the pultrusion die tube 26 so that the distance between the outer surface of the core and the inner surface of the die tube is non-uniform. As the resin coated fibers 28 are heated and cured within the die tube 26, a high strength fiber-resin composite jacket 52 is cured around the lightweight core 24A, and forms a rod 20 having outer dimensions the same as the inside dimensions of the die tube. The consistently eccentric placement of the lightweight core 24A as it travels through the pultrusion die tube 26 results in the creation of a longitudinally extending reinforcing bead 22A where the distance between the core and the die tube is significantly greater than the average core to die tube distance.

An important feature of the rod 20 having a lightweight tubular core 24A eccentrically positioned within the fiber-resin jacket 52 is that the bending strength is increased without any increase in weight over a similar rod 38 having a concentrically situated lightweight core. When the improved rod 20 is used for a shovel handle 30 as in FIG. 5, less jacket material 52 is typically needed along the top side 54 of the handle because the cured fiber-resin composite is significantly stronger in tension than in compression. For this reason, it is generally preferable to position the reinforcing bead 22A along the bottom side 34 of the rod 20.

However, under certain conditions the thinner portion of the jacket 52 along the top side 54 of the improved rod 20 will fail under a bending load. Sometimes the eccentric positioning of the lightweight tubular core 24A, while providing sufficient fiber-resin material in the reinforcing bead 22A to resist the compressive stresses applied along the bottom side 34 of the improved rod 20, leaves an insufficiently thick jacket along the top side 54. When needed, an alternate lightweight, generally tubular core 24B can be provided which facilitates the formation of a pair of reinforcing beads 22B and 22B' integrally with the jacket 52 to reduce or eliminate the tensile stress failure problem, while only slightly increasing the weight of the reinforced rod 20.

As illustrated in FIG. 8, this alternate core 24B includes a longitudinally extending U-shaped channel 56. During manufacturing, the alternate core 24B is preferably eccentrically positioned as it travels through the die tube 26 to form the pair of reinforcing beads 22B and 22B' where the distance between the core and the die tube is significantly greater than the average core to die tube distance. Normally, one reinforcing bead 22B' is situated within the U-shaped channel 56, and the other bead 22B is situated within the opposite portion of the jacket 52. By positioning the reinforcing beads 22B and 22B' 180 degrees from each other, they can be located along both the top and bottom sides 54 and 34 of the rod 20 to complement each other in providing increased tensile, as well as compression, strength.

Moreover, lightweight cores 24 having many other shapes can be advantageously used in accordance with the present invention to increase the compression and/or tensile strength characteristics of the manufactured rods 20 to fit particular circumstances. For instance, a modified lightweight core 24C, shaped to resemble a tube having a longitudinally extending flat surface 58, can be positioned within the die tube 26 to form a rod 20 having a reinforcing bead 22C in the space between the flat surface of the core and the inner surface of the die tube (FIG. 9). Such a reinforced rod 20 would be particularly useful in applications where especially high compression stresses along the reinforced side were expected, and a slight increase in rod weight would be acceptable.

Further, a lightweight core 24D can be provided with a longitudinally extending U-shaped channel 56, and an opposite and similarly longitudinally extending flat surface 58 to encourage the formation of a pair of reinforcing beads 22D and 22D' within the jacket 52 (FIG. 10). Another lightweight core 24E can be provided a pair of oppositely situated and longitudinally extending flat surfaces 58 and 58' which also encourage the formation of a pair of reinforcing beads 22E and 22E' within the jacket 52 (FIG. 11). While most non-tubular lightweight cores will cause the associated rods 20 to be slightly heavier than rods simply having the tubular core 24A, due to the increased fiber-resin material included in the jackets 52, the increased strength of these rods often offsets this added weight.

As illustrated in FIGS. 10 and 11, the lightweight cores 24 need not necessarily be hollow, but can be provided a web lattice 60 which facilitates end-to-end attachment of adjacent cores. When such web lattices 60 are included within the lightweight cores 24, a plug 62, as provided on the reinforcing core 36 shown in FIG. 6, can be simply inserted into a small tubular channel 64 provided at the center of the lattice to frictionally attach the adjacent cores. The ability to attach cores end-to-end can importantly speed manufacture of the reinforced rods 20 by facilitating the continuous and automatic pultrusion of rods in accordance with the present invention.

Notwithstanding the cross-sectional shape and/or the positioning of the lightweight cores 24, specific segments of the reinforced rods 20 can be further strengthened by alternately inserting reinforcing cores 36 between the lightweight cores. The reinforcing cores 36, preferably made of the same or a similar fiber-resin composite material as the jacket 52, can be introduced into the die tube 26 to produce a reinforced rod 20 having the reinforcing cores at locations most likely to be subjected to the greatest bending stresses, thereby providing increased compression and tensile strength in those areas. Additionally, these reinforcing cores 36 can have a different cross-sectional shape from the adjacent lightweight cores 24. It is preferred, however, that the lightweight and reinforcing cores 24 and 36 have the same cross-sectional shape and that they are similarly positioned within the die tube 26.

Reinforced rods 20 used as shovel handles 30 typically have one end inserted into a socket 66 of a shovel blade 68. This end is conventionally fastened securely within the socket 66 by a rivet, bolt or the like 70. Also, a grip 72 can be secured to the opposite end of the rod 20 to complete the shovel handle 30 (FIG. 5). Reinforcing cores 36 are usually desirable at these ends to maximize the strength of the rod 20 while minimizing the overall rod weight, because the greatest forces expected to be applied to the rod will be at the grip 72 and the socket 66.

Accordingly, the reinforced rods 20 of the present invention provide lightweight tool handles 30 having superior strength characteristics than prior handles, and they can be produced in a quick, reliable and efficient manner. Such rods have improved bending resistance along their entire lengths, and minimize any undesirable weight increase. Additionally, improved handles manufactured in accordance with the present invention are strong due to the perfect molded fit of the cores to the fiber-resin jacket. Finally, because of the compatability of the adhesive systems, a strong bond between the cores to the fiber-resin jacket is created.

Although several particular embodiments of the invention have been described in detail for purposes of illustration, various modifications may be made without departing from the spirit and scope of the invention. Accordingly, the invention is not to be limited, except as by the appended claims.

I claim:

1. A handle for tools such as shovels, hoes, rakes, forks and the like, said handle comprising:
   a core having alternately non-reinforcing and reinforcing sections; and
   a fiber-resin jacket including a reinforcing bead, formed around said core to securely position and hold said core within said jacket, wherein said reinforcing bead is formed by the position or configuration of said core within the confines of said jacket.

2. A handle as set forth in claim 1 wherein the outer surface of said jacket is generally cylindrical.

3. A handle as set forth in claim 2 wherein said core is substantially cylindrical, and is eccentrically positioned within said jacket so that a longitudinally extending reinforcing bead is integrally formed within said jacket where the distance between said core and the outer surface of said jacket is significantly greater than the average core to outer jacket surface distance.

4. A handle as set forth in claim 3 wherein said core includes a longitudinally extending, U-shaped channel located opposite said reinforcing bead, said channel being filled with the fiber-resin material of said jacket to form a second reinforcing bead.

5. A handle as set forth in claim 2 wherein said core resembles a tube having a longitudinally extending flat surface, and a reinforcing bead is provided said jacket adjacent said flat surface.

6. A handle as set forth in claim 5 wherein said core includes a longitudinally extending, U-shaped channel located opposite said reinforcing bead, said channel being filled with the fiber-resin material of said jacket to form a second reinforcing bead.

7. A handle as set forth in claim 5 wherein said core includes a second longitudinally extending flat surface generally opposite said flat surface, and a second reinforcing bead provided by said jacket adjacent said second flat surface.

8. A handle as set forth in claim 1 wherein said non-reinforcing and reinforcing core sections have the same cross-sectional size and shape.

9. A handle as set forth in claim 1 wherein said reinforcing section is composed of a fiber-resin material similar to the material of said jacket.

10. A handle as set forth in claim 1 wherein said reinforcing section is composed of the same fiber-resin material as the material of said jacket.

11. A reinforced rod, comprising:
    a core; and
    a fiber-resin jacket including a longitudinally extending reinforcing bead, formed around said core to securely position and hold said core within said jacket, wherein said reinforcing bead is formed by the position or configuration of said core within the confines of said jacket;

said core including a reinforcing section extending along a first portion of said rod's length, and an adjoining non-reinforcing section extending along a second portion of said rod's length.

12. A reinforced rod, comprising:

a core; and a fiber-resin jacket including a longitudinally extending reinforcing bead, formed around said core to securely position and hold said core within said jacket, wherein said reinforcing bead is formed by the position or configuration of said core within the confines of said jacket, the outer surface of said jacket being generally cylindrical;

said core being substantially cylindrical and eccentrically positioned within said jacket so that said longitudinally extending reinforcing bead is integrally formed within said jacket where the distance between said core and the outer surface of said jacket is significantly greater than the average core to outer jacket surface distance; and said core including a longitudinally extending, U-shaped channel located opposite said reinforcing bead, said channel being filled with the fiber-resin material of said jacket to form a second reinforcing bead.

13. A reinforced rod, comprising:

a core; and a fiber-resin jacket including a longitudinally extending reinforcing bead, formed around said core to securely position and hold said core within said jacket, wherein said reinforcing bead is formed by the position or configuration of said core within the confines of said jacket;

wherein said core resembles a tube having a longitudinally extending flat surface, and a reinforcing bead is provided said jacket adjacent said flat surface.

14. A method of manufacturing reinforced rods which are useful as tool handles, comprising the steps of:

feeding a core into a pultrusion die tube, wherein the core is not centrally positioned within the die tube;

surrounding the core with resin coated fibers;

pulling the core through the pultrusion die tube while keeping the core surrounded by the resin coated fibers; and curing the resin coated fibers around the core to form a fiber-resin jacket having a longitudinally extending reinforcing bead.

15. A method as recited in claim 14 wherein the core includes a reinforcing section and an adjoining non-reinforcing section which are connected end-to-end prior to said feeding step.

16. A method of manufacturing reinforced rods, comprising the steps of:

feeding a core into a pultrusion die tube, wherein the configuration of the core is of a different shape than the shape of the die tube;

surrounding the core with resin coated fibers;

pulling the core through the pultrusion die tube while keeping the core surrounded by the resin coated fibers; and curing the resin coated fibers around the core to form a fiber resin jacket having a longitudinally extending reinforcing bead that is formed by the specific configuration of the core.

17. A method as recited in claim 16 wherein the core includes a reinforcing section and an adjoining non-reinforcing section which are connected end-to-end prior to said feeding step.

* * * * *